United States Patent
Sakai et al.

(10) Patent No.: US 11,028,260 B2
(45) Date of Patent: Jun. 8, 2021

(54) RUBBER COMPOSITION, RUBBER MOLDED BODY, AND METHOD FOR PRODUCTION OF RUBBER MOLDED BODY

(71) Applicant: Sumitomo Chemical Company, Limited, Tokyo (JP)

(72) Inventors: Takashi Sakai, Ichihara (JP); Sadayuki Nakano, Ichihara (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 145 days.

(21) Appl. No.: 16/313,508

(22) PCT Filed: Jun. 27, 2017

(86) PCT No.: PCT/JP2017/023532
§ 371 (c)(1),
(2) Date: Dec. 27, 2018

(87) PCT Pub. No.: WO2018/003783
PCT Pub. Date: Jan. 4, 2018

(65) Prior Publication Data
US 2019/0225785 A1    Jul. 25, 2019

(30) Foreign Application Priority Data

Jun. 28, 2016   (JP) .............................. JP2016-127781

(51) Int. Cl.
| | | |
|---|---|---|
| C08L 23/16 | (2006.01) | |
| C08K 3/04 | (2006.01) | |
| C08K 3/32 | (2006.01) | |
| C08K 5/17 | (2006.01) | |
| C08K 5/49 | (2006.01) | |
| C08K 3/28 | (2006.01) | |
| C08K 7/22 | (2006.01) | |
| C08L 23/08 | (2006.01) | |
| C08K 5/00 | (2006.01) | |
| C08K 3/016 | (2018.01) | |
| C08K 5/34 | (2006.01) | |
| C08K 7/24 | (2006.01) | |
| C08K 5/3462 | (2006.01) | |

(52) U.S. Cl.
CPC .............. *C08L 23/16* (2013.01); *C08K 3/016* (2018.01); *C08K 3/04* (2013.01); *C08K 3/28* (2013.01); *C08K 3/32* (2013.01); *C08K 5/0066* (2013.01); *C08K 5/17* (2013.01); *C08K 5/3462* (2013.01); *C08K 5/49* (2013.01); *C08K 7/22* (2013.01); *C08K 7/24* (2013.01); *C08L 23/08* (2013.01); *C08K 2003/329* (2013.01); *C08L 2201/02* (2013.01); *C08L 2203/30* (2013.01)

(58) Field of Classification Search
CPC ...... C08L 23/26; C08L 23/08; C08L 2201/02; C08L 2203/30; C08K 3/04; C08K 3/33; C08K 3/28; C08K 3/016; C08K 5/17; C08K 5/49; C08K 5/0066; C08K 7/22; C08K 7/24; C08K 2003/329
USPC .......................................................... 521/25
See application file for complete search history.

(56) References Cited

U.S. PATENT DOCUMENTS

| | | | | |
|---|---|---|---|---|
| 8,297,013 | B2 * | 10/2012 | Ueda ....................... | E06B 5/162 52/232 |
| 2017/0253691 | A1 | 9/2017 | Shimamoto et al. | |
| 2017/0253716 | A1 | 9/2017 | Shimamoto et al. | |

FOREIGN PATENT DOCUMENTS

| | | | | |
|---|---|---|---|---|
| JP | H6-073237 | A | | 3/1994 |
| JP | 08208875 | A | * | 8/1996 |
| JP | H8-208875 | A | | 8/1996 |
| JP | 09077894 | A | * | 3/1997 |
| JP | H9-077894 | A | | 3/1997 |
| JP | H10-025379 | A | | 1/1998 |
| JP | 10182894 | A | * | 7/1998 |
| JP | H10-182894 | A | | 7/1998 |
| JP | H11236472 | A | | 8/1999 |
| JP | 2001-040156 | A | | 2/2001 |
| JP | 2009-067986 | A | | 4/2009 |
| JP | 2012-019001 | A | | 1/2012 |
| JP | 2013-018847 | A | | 1/2013 |
| JP | 2014-159541 | A | | 9/2014 |
| JP | 2014159541 | A | * | 9/2014 |
| WO | 2015/159697 | A1 | | 10/2015 |
| WO | 2016/031910 | A1 | | 3/2016 |
| WO | 2016031905 | A1 | | 3/2016 |
| WO | WO-2016031910 | A1 | * | 3/2016 ............. C08G 59/20 |

OTHER PUBLICATIONS

Extended European Search Report dated Nov. 27, 2019 in EP Application No. 17820137.2.
Int'l Preliminary Report on Patentability dated Jan. 10, 2019 in Int'l Application No. PCT/JP2017/023532.
Office Action dated Sep. 25, 2020 in CN Application No. 201780039936. 7.

* cited by examiner

*Primary Examiner* — Michael Bernshteyn
(74) *Attorney, Agent, or Firm* — Panitch Schwarze Belisario & Nadel LLP

(57) ABSTRACT

A rubber composition contains: (A) an ethylene-α-olefin-based copolymer rubber including an ethylene unit and an α-olefin unit having 3 or more carbon atoms; (B) a fire retardant including a phosphorus atom and a nitrogen atom; (C) a thermally expandable graphite; and (D) additive particles that are porous particles or particles having ion exchangeability. A content of the fire retardant is 50 to 250 parts by mass and a content of the additive particles is 15 parts by mass or less with respect to 100 parts by mass of the ethylene-α-olefin-based copolymer rubber.

5 Claims, 1 Drawing Sheet

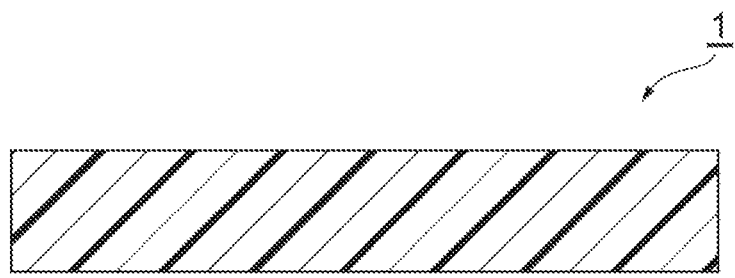

RUBBER COMPOSITION, RUBBER MOLDED BODY, AND METHOD FOR PRODUCTION OF RUBBER MOLDED BODY

CROSS-REFERENCE TO RELATED APPLICATION

This application is a Section 371 of International Application No. PCT/JP2017/023532, filed Jun. 27, 2017, which was published in the Japanese language on Jan. 4, 2018 under International Publication No. WO 2018/003783 A1, and claims priority under 35 U.S.C. § 119(b) to Japanese Application No. 2016-127781, filed Jun. 28, 2016, the disclosures of which are incorporated herein by reference in their entirety.

TECHNICAL FIELD

The present invention relates to a rubber composition, a rubber molded body, and a method for producing a rubber molded body.

BACKGROUND ART

An ethylene-α-olefin-based copolymer rubber typified by an ethylene-α-olefin copolymer rubber and an ethylene-α-olefin-nonconjugated polyene copolymer rubber is widely used for applications such as automotive components, electrical and electronic components, and railroad vehicle components.

In applications for electrical and electronic devices, and the like, in order to prevent a casing or a component from being ignited and burnt by exposure to heat generated from the inside of the device or high temperature from the outside, it is important that materials for railroad vehicles have fire retardancy in order to avoid being ignited and burnt by fire.

In the related art, in order to impart fire retardancy to a rubber composition, a halogenated fire retardant and an antimony-based compound have been used in many cases. However, in recent years, there is an increasing demand for a halogen-free rubber composition not containing a halogenated fire retardant. As a method for imparting fire retardancy without use of a halogenated fire retardant, there is known a method of adding red phosphorus, an inorganic phosphorus fire retardant typified by a phosphate fire retardant, an organic phosphorus fire retardant typified by ammonium polyphosphate, or a metal hydroxide-based fire retardant to a synthetic resin (see Patent Literatures 1 to 3).

CITATION LIST

Patent Literature

Patent Literature 1: Japanese Unexamined Patent Application Publication No. 2013-18847
Patent Literature 2: Japanese Unexamined Patent Application Publication No. 2001-40156
Patent Literature 3: Japanese Unexamined Patent Application Publication No. H6-73237

SUMMARY OF INVENTION

Technical Problem

In order to enhance fire retardancy of a rubber molded body, generally, it is necessary to increase the amount of a fire retardant blended. However, blending of a large amount of the fire retardant may cause mold contamination by bloom (see ISO 1382:2012 (en) Rubber-Vocabulary, 2.50 bloom) in a molding step. For this reason, while the level of fire retardancy required for a rubber composition further increases, there is a tendency that it becomes difficult to achieve both of fire retardancy and mold contamination suppression.

In this regard, an object of an aspect of the present invention is to provide a rubber composition having high fire retardancy and hardly contaminating a mold in a molding step.

Solution to Problem

According to an aspect of the present invention, there is provided a rubber composition containing:
(A) an ethylene-α-olefin-based copolymer rubber including an ethylene unit and an α-olefin unit having 3 or more carbon atoms;
(B) a fire retardant including a phosphorus atom and a nitrogen atom;
(C) a thermally expandable graphite; and
(D) additive particles that are porous particles or particles having ion exchangeability. In this rubber composition, a content of (B) the fire retardant is 50 to 250 parts by mass and a content of (D) the additive particles is 15 parts by mass or less, with respect to 100 parts by mass of (A) the ethylene-α-olefin-based copolymer rubber. This rubber composition has high fire retardancy and hardly contaminates a mold in a molding step.

Advantageous Effects of Invention

According to the aspect of the present invention, there is provided a rubber composition having high fire retardancy and hardly contaminating a mold in a molding step.

BRIEF DESCRIPTION OF DRAWINGS

FIG. 1 is a cross-sectional view illustrating an embodiment of a rubber molded body.

DESCRIPTION OF EMBODIMENTS

Hereinafter, embodiments of the present invention will be described. However, the present invention is not limited to the following embodiment.

Rubber Composition

A rubber composition according to an embodiment contains an ethylene-α-olefin-based copolymer rubber as a component (A), a fire retardant including a phosphorus atom and a nitrogen atom as a component (B), a thermally expandable graphite as a component (C), and additive particles as a component (D).

Component (A): Ethylene-α-Olefin-Based Copolymer Rubber

The ethylene-α-olefin-based copolymer rubber includes an ethylene unit and an α-olefin unit having 3 or more carbon atoms as main monomer units. The number of carbon atoms in the α-olefin unit may be 3 or more and 20 or less. The total content of the ethylene unit and the α-olefin unit in the ethylene-α-olefin-based copolymer rubber may be 60% by mass or more and 100% by mass or less, or 80% by mass or more and 100% by mass or less with respect to the total mass of the copolymer rubber. The ethylene-α-olefin-based copolymer rubber may be, for example, an ethylene-α-olefin copolymer rubber substantially consists of an ethylene unit and an α-olefin unit, or an ethylene-α-olefin-nonconjugated polyene copolymer rubber including an ethylene unit, an α-olefin unit, and a nonconjugated polyene unit. In the present specification, the term "name of monomer+unit" such as "ethylene unit," "α-olefin unit," and "nonconjugated polyene unit" means a "monomer unit based on the monomer."

Specific examples of the α-olefin constituting the ethylene-α-olefin-based copolymer rubber include linear olefins such as propylene, 1-butene, 1-pentene, 1-hexene, 1-heptene, 1-octene, 1-nonene, and 1-decene; branched olefins such as 3-methyl-1-butene, 3-methyl-1-pentene, and 4-methyl-1-pentene; and cyclic olefins such as vinylcyclohexane. These are used alone or in combination of two or more kinds thereof. The α-olefin included in the ethylene-α-olefin-based copolymer rubber may be at least one of propylene or 1-butene, or may be propylene.

The mass ratio of the ethylene unit/α-olefin unit in the ethylene-α-olefin-based copolymer rubber is not particularly limited, but may be 90/10 to 30/70, or 85/15 to 45/55.

The total content of the ethylene unit, the α-olefin unit, and the nonconjugated polyene unit in the ethylene-α-olefin-nonconjugated polyene copolymer rubber may be 60% by mass or more and 100% by mass or less, or 80% by mass or more and 100% by mass or less, with respect to the total mass of the copolymer rubber.

The content of the nonconjugated polyene unit in the ethylene-α-olefin-nonconjugated polyene copolymer rubber may be 0 or more and 40 or less in terms of iodine value (unit: g/100 g of the copolymer rubber). When the content of the nonconjugated polyene unit is 40 or less in terms of iodine value, the weather resistance of the molded article thus obtained may be improved. From the same viewpoint, the content of the nonconjugated polyene unit may be 0 or more and 35 or less, or 0 or more and 30 or less, in terms of iodine value.

The number of carbon atoms of the nonconjugated polyene constituting the ethylene-α-olefin-nonconjugated polyene copolymer rubber may be 3 or more and 20 or less. Specific examples of the nonconjugated polyene include chain nonconjugated dienes such as 1,4-hexadiene, 1,6-octadiene, 2-methyl-1,5-hexadiene, 6-methyl-1,5-heptadiene, and 7-methyl-1,6-octadiene; cyclic nonconjugated dienes such as cyclohexadiene, dicyclopentadiene, 5-vinylnorbornene, 5-ethylidene-2-norbornene, 5-(2-propenyl)-2-norbornene, 5-(3-butenyl)-2-norbornene, 5-(4-pentenyl)-2-norbornene, 5-(5-hexenyl)-2-norbornene, 5-(6-heptenyl)-2-norbornene, 5-(7-octenyl)-2-norbornene, 5-methylene-2-norbornene, and 6-chloromethyl-5-isopropenyl-2-norbornene; and trienes such as 4-ethylidene-8-methyl-1,7-nonadiene, 5,9,13-trimethyl-1,4,8,12-tetradecadiene, 4-ethylidene-12-methyl-1,11-pentadecadiene, 2,3-diisopropylidene-5-norbornene, 2-ethylidene-3-isopropylidene-5-norbornene, 2-propenyl-2,2-norbornadiene, 1,3,7-octatriene, 6,10-dimethyl-1,5,9-undecatriene, 5,9-dimethyl-1,4,8-decatriene, 13-ethyl-9-methyl-1,9,12-pentadecatriene, 5,9,8,14,16-pentamethyl-1,7,14-hexadecatriene, and 1,4,9-decatriene. These are used alone or in combination. Among these, the ethylene-α-olefin-nonconjugated polyene copolymer rubber may include 5-ethylidene-2-norbornene, dicyclopentadiene, 5-vinylnorbornene, or a combination thereof.

Specific examples of the ethylene-α-olefin-based copolymer rubber include ethylene-propylene copolymer rubber, ethylene-propylene-5-ethylidene-2-norbornene copolymer rubber, ethylene-propylene-dicyclopentadiene copolymer rubber, ethylene-propylene-1,4-hexadiene copolymer rubber, ethylene-propylene-1,6-octadiene copolymer rubber, ethylene-propylene-2-methyl-1,5-hexadiene copolymer rubber, ethylene-propylene-6-methyl-1,5-heptadiene copolymer rubber, ethylene-propylene-7-methyl-1,6-octadiene copolymer rubber, ethylene-propylene-cyclohexadiene copolymer rubber, ethylene-propylene-5-vinylnorbornene copolymer rubber, ethylene-propylene-5-(2-propenyl)-2-norbornene copolymer rubber, ethylene-propylene-5-(3-butenyl)-2-norbornene copolymer rubber, ethylene-propylene-5-(4-pentenyl)-2-norbornene copolymer rubber, ethylene-propylene-5-(5-hexenyl)-2-norbornene copolymer rubber, ethylene-propylene-5-(6-heptenyl)-2-norbornene copolymer rubber, ethylene-propylene-5-(7-octenyl)-2-norbornene copolymer rubber, ethylene-propylene-5-methylene-2-norbornene copolymer rubber, ethylene-propylene-4-ethylidene-8-methyl-1,7-nonadiene copolymer rubber, ethylene-propylene-5,9,13-trimethyl-1,4,8,12-tetradecadiene copolymer rubber, ethylene-propylene-4-ethylidene-12-methyl-1,11-pentadecadiene copolymer rubber, ethylene-propylene-6-chloromethyl-5-isopropenyl-2-norbornene copolymer rubber, ethylene-propylene-2,3-diisopropylidene-5-norbornene copolymer rubber, ethylene-propylene-2-ethylidene-3-isopropylidene-5-norbornene copolymer rubber, ethylene-propylene-2-propenyl-2,2-norbornadiene copolymer rubber, ethylene-propylene-1,3,7-octatriene copolymer rubber, ethylene-propylene-6,10-dimethyl-1,5,9-undecatriene copolymer rubber, ethylene-propylene-5,9-dimethyl-1,4,8-decatriene copolymer rubber, ethylene-propylene-13-ethyl-9-methyl-1,9,12-pentadecatriene copolymer rubber, ethylene-propylene-5,9,8,14,16-pentamethyl-1,7,14-hexadecatriene copolymer rubber, and ethylene-propylene-1,4,9-decatriene copolymer rubber. These are used alone or in combination.

The ethylene-α-olefin-based copolymer rubber may include ethylene-propylene copolymer rubber, ethylene-propylene-5-ethylidene-2-norbornene copolymer rubber, ethylene-propylene-dicyclopentadiene copolymer rubber, ethylene-propylene-5-vinylnorbornene copolymer rubber, or a combination thereof, or may include ethylene-propylene copolymer rubber and/or ethylene-propylene-5-ethylidene-2-norbornene copolymer rubber.

In a case where the rubber composition includes two or more types of ethylene-α-olefin-based copolymer rubber, the mass ratio and the iodine value of the ethylene unit/α-olefin unit are a value in the entirety of these two or more types of ethylene-α-olefin-based copolymer rubber.

The Mooney viscosity of the ethylene-α-olefin-based copolymer rubber at 100° C. (ML1+4, 100° C.) may be 10 to 350, or 30 to 300. When the Mooney viscosity is too small, the mechanical strength of the rubber molded body may decrease. When the Mooney viscosity is too large, kneading processability tends to decrease.

The molecular weight distribution (Mw/Mn) of the ethylene-α-olefin-based copolymer may be 1.5 or more and 5.0 or less. When the molecular weight distribution is 1.5 or more, favorable roll processability of the rubber composition is easily obtainable. When the molecular weight distribution is 5.0 or less, the mechanical properties of the molded article tends to improve. From the same viewpoint, the molecular weight distribution of the ethylene-α-olefin-based copolymer may be 2.0 or more and 3.0 or less. The molecular weight distribution can be adjusted by changing polymerization conditions.

The molecular weight distribution in the present specification is a ratio (Mw/Mn) calculated from the weight average molecular weight (Mw) and the number average molecular weight (Mn) measured using gel permeation chromatography (GPC method) in terms of polystyrene.

Measurement conditions of the weight average molecular weight and the number average molecular weight by the GPC method are, for example, as follows.

GPC apparatus: trade name HLC-8121GPC/HT, manufactured by Tosoh Corporation

Column: trade name TSKgel GMHHR-H(S)HT, manufactured by Tosoh Corporation

Molecular weight standard substance: polystyrene having a molecular weight of 500 or more and 20,000,000 or less Elution solvent flow velocity: 1.0 mL/min Sample concentration: 1 mg/mL Measurement temperature: 140° C.

Elution solvent: orthodichlorobenzene

Injection amount: 500 μL

Detector: differential refractometer

The ethylene-α-olefin-based copolymer may be combined with process oils such as paraffin-based oil and naphthene-based oil and then used as oil-extended rubber in preparation of the rubber composition.

Method for Producing Ethylene-α-Olefin-Based Copolymer Rubber

The ethylene-α-olefin-based copolymer rubber of an embodiment is not particularly limited, and for example, can be produced by a method including a step of copolymerizing a monomer mixture including ethylene, α-olefin, and as necessary, nonconjugated polyene in the presence of a catalyst such as a so-called Ziegler-Natta catalyst or a metallocene catalyst.

As the catalyst for copolymerization, a catalyst obtained by using a vanadium compound represented by the following formula (1) and an organoaluminum compound represented by the following formula (2) is preferably used. Accordingly, an ethylene-α-olefin-based copolymer rubber having a lower product of the monomer reactivity ratio can be easily produced.

$$VO(OR)_m X_{3-m} \quad (1)$$

[In the formula, R represents a linear hydrocarbon group having 1 or more and 8 or less carbon atoms, X represents a halogen atom, and m represents a number satisfying 0<m≤3.]

$$R''_j AlX''_{3-j} \quad (2)$$

[In the formula, R" represents a hydrocarbon group, X" represents a halogen atom, and j represents a number satisfying 0<j≤3.]

Specific examples of R in the formula (1) include a methyl group, an ethyl group, a n-propyl group, a n-butyl group, a n-pentyl group, and a n-hexyl group. Among these, a linear alkyl group having 1 or more and 3 or less carbon atoms is preferable. Examples of X include a fluorine atom and a chlorine atom. m is preferably a number satisfying 1≤m≤2.

Specific examples of the vanadium compound represented by the formula (1) include $VO(OCH_3)Cl_2$, $VO(OC_2H_5)C_2$, $VO(O(n-C_3H_7))Cl_2$, $VO(O(n-C_4H))C_2$, $VO(O(n-C_5H_{11}))Cl_2$, $VO(O(n-C_6H_{13}))Cl_2$, $VO(O(n-CH_{15}))Cl_2$, $VO(O(n-C_8H_{17}))Cl_2$, $VO(OCH_3)_{0.5}Cl_{2.5}$, $VO(OC_2H_5)_{0.5}Cl_{2.5}$, $VO(O(n-C_3H_7))_{0.5}Cl_{2.5}$, $VO(O(n-C_4H_9))_{0.5}Cl_{2.5}$, $VO(O(n-C_5H_{11}))_{0.5}Cl_{2.5}$, $VO(O(n-C_6H_{13}))_{0.5}Cl_{2.5}$, $VO(O(n-C_7H_{15}))_{0.5}Cl_{2.5}$, $VO(O(n-C_5H_{17}))_{0.5}Cl_{2.5}$, $VO(OCH_3)_{1.5}Cl_{1.5}$, $VO(OC_2H_5)_{1.5}Cl_{1.5}$, $VO(O(n-C_3H_7))_{1.3}Cl_{1.5}$, $VO(O(n-C_4H_9))_{1.5}Cl_{1.5}$, $VO(O(n-C_5H_{11}))_{1.5}Cl_{1.5}$, $VO(O(n-C_6H_{13}))_{1.5}Cl_{1.5}$, $VO(O(n-C_7H_5))_{1.5}Cl_{1.5}$, $VO(O(n-CH_{17}))_{1.5}Cl_{1.5}$, $VO(OCH_3)_{0.8}Cl_{2.2}$, $VO(OC_2H_5)_{0.8}Cl_{2.2}$, $VO(O(n-C_3H_7))_{0.8}Cl_{2.2}$, $VO(O(n-CH_9))_{0.8}Cl_{2.2}$, $VO(O(n-C_5H_{11}))_{0.5}Cl_{2.2}$, $VO(O(n-C_6H_{13}))_{0.5}Cl_{2.2}$, $VO(O(n-C_7H_{15}))_{0.5}Cl_{2.1}$, $VO(O(n-C_8H_{17}))_{0.5}Cl_{2.2}$, $VO(OCH_3)_{1.8}Cl_{12}$, $VO(OC_2H_5)_{1.5}Cl_{12}$, $VO((n-C_3H_7))_{1.8}Cl_{1.2}$, $VO(O(n-C_4H_9))_{1.5}Cl_{1.2}$, $VO(O(n-CH_{11}))_{1.8}Cl_{1.2}$, $VO(O(n-C_6H_{13}))_{1.8}Cl_{1.2}$, $VO(O(n-C_7H_{15}))_{1.5}Cl_{1.2}$, and $VO(O(n-C_8H_{17}))_{1.8}Cl_{1.2}$. Among these, $VO(OC_2H_5)Cl_2$, $VO(OC_2H_5)_{0.5}Cl_{2.5}$, $VO(OC_2H_5)_{1.5}Cl_{1.5}$, $VO(OC_2H)_{0.8}Cl_{2.2}$, and $VO(OC_2H_5)_{1.8}Cl_{1.2}$ are particularly preferable. These may be used alone or in combination.

The vanadium compound represented by the formula (1) is obtained, for example, by a method of reacting $VOX_3$ and ROH at a predetermined molar ratio. For example, the reaction of $VOCl_3$ and $C_2H_5OH$ is represented by the following formula. $VOX_3$ and ROH may be supplied to a polymerization vessel to produce the vanadium compound represented by the formula (1) in the polymerization vessel.

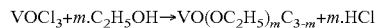

$$VOCl_3 + m.C_2H_5OH \rightarrow VO(OC_2H_5)_m C_{3-m} + m.HCl$$

R" in the formula (2) may be an alkyl group having 1 to 10 carbon atoms, and specific examples thereof include a methyl group, an ethyl group, a n-propyl group, an iso-propyl group, a n-butyl group, an iso-butyl group, a pentyl group, and a hexyl group. Examples of X" include a fluorine atom and a chlorine atom. j is preferably a number satisfying 0<j≤2

Specific examples of the organoaluminum compound represented by the formula (2) include $(C_2H_5)_2AlCl$, $(n-C_4H_9)_2AlCl$, $(iso-C_4H_9)_2AlCl$, $(n-C_6H_{13})_2AlCl_2$, $(C_2H_5)_{1.5}AlCl_{1.5}$, $(n-C_4H_9)_{1.5}AlCl_{1.5}$, $(iso-C_4H_9)_{1.5}AlCl_{1.5}$, $(n-C_6H_{13})_{1.5}AlCl_{1.5}$, $C_2H_5AlCl_2$, $(n-C_4H_9)AlCl_2$, $(iso-C_4H_1)AlCl_2$, and $(n-C_6H_{13})AlCl_2$. Among these, $(C_2H_5)_2AlCl$, $(C_2H_5)_{1.5}AlCl_{1.5}$, and $C_2H_5AlCl_2$ are particularly preferable. These may be used alone or in combination.

The molar ratio of amount of the organoaluminum compound of the formula (2) and the vanadium compound of the formula (1) used (mole of the organoaluminum compound/mole of the vanadium compound) is preferably 0.1 or more and 50 or less, more preferably 1 or more and 30 or less, further preferably 2 or more and 15 or less, and particularly preferably 3 or more and 10 or less. By adjusting the molar ratio, viscosity, Mw/Mn, Mz/Mn, and the like of the copolymer rubber can be adjusted. For example, when the molar ratio is large, the viscosity of the copolymer rubber tends to increase and Mw/Mn and Mz/Mn tend to decrease.

The polymerization reaction can be performed, for example, by a method using one polymerization vessel or by using two polymerization vessels coupled in series. A monomer, a catalyst, and as necessary, other components are supplied to a polymerization vessel, and then the monomer can be polymerized in the polymerization vessel.

The polymerization reaction is generally performed in a solvent. Examples of the solvent used in the polymerization include inert solvents such as aliphatic hydrocarbons such as propane, butane, isobutane, pentane, hexane, heptane, and octane; and alicyclic hydrocarbons such as cyclopentane and cyclohexane. These may be used alone or in combination. Among these, aliphatic hydrocarbons are preferable.

The polymerization temperature may be usually 0° C. or higher and 200° C. or lower, and is preferably 20° C. or higher and 150° C. or lower and more preferably 30° C. or higher and 120° C. or lower. The polymerization pressure may be usually 0.1 MPa or more and 10 MPa or less, and is preferably 0.1 MPa or more and 5 MPa or less and more preferably 0.1 MPa or more and 3 MPa or less. By adjusting the polymerization temperature, the Mw/Mn or the like of the component (A) can be adjusted. For example, when the polymerization temperature is low, Mw/Mn tends to decrease.

At the time of polymerization, as necessary, hydrogen may be supplied as a molecular weight regulator to a polymerization vessel. The amount of hydrogen supplied to the polymerization vessel is preferably 0.001 to 0.1 NL, more preferably 0.005 to 0.05 NL, and further preferably 0.01 to 0.04 NL per 1 kg of a solvent supplied to the polymerization vessel. By adjusting the amount of hydrogen supplied, Mw/Mn, viscosity, and the like of the ethylene-α-olefin-based copolymer can be adjusted. For example, when the amount of hydrogen supplied is large, Mw/Mn tends to decrease. When the amount of hydrogen supplied is small, the viscosity tends to increase.

The amount of the vanadium compound supplied to the polymerization vessel is preferably 0.002 part by mass or more and 0.2 part by mass or less, and more preferably 0.003 part by mass or more and 0.1 part by mass or less per 100 parts by mass of the solvent supplied to the polymerization vessel. By adjusting the amount of the vanadium compound with respect to the solvent, the viscosity of the ethylene-α-olefin-based copolymer rubber can be adjusted. For example, by increasing the amount of the vanadium compound, there is a tendency that the viscosity can increase.

Component (B): Fire Retardant Including a Phosphorus Atom and a Nitrogen Atom

The fire retardant as the component (B) is comprised of one or more kinds of compounds including a phosphorus atom and a nitrogen atom. This fire retardant can include a compound having an amino group among fire retardants generally referred to as phosphorus fire retardants. The fire retardant including a phosphorus atom and a nitrogen atom may include a phosphate salt formed from phosphoric acid or a polyphosphoric acid and alkylene polyamine or polyalkylene polyamine. The fire retardant including a phosphorus atom and a nitrogen atom is a compound included in the rubber composition separately from the additive particles as the component (D).

The phosphoric acid or polyphosphoric acid constituting the phosphate salt can be, for example, phosphoric acid (orthophosphoric acid), pyrophosphoric acid (diphosphoric acid), triphosphoric acid, tetraphosphoric acid, metaphosphoric acid (trimetaphosphoric acid, tetrametaphosphoric acid, hexametaphosphoric acid, or the like), or a combination thereof.

The phosphate salt can include one or more kinds of alkylene polyamine and polyalkylene polyamine (hereinafter, these are collectively referred to as "(poly)alkylene polyamine"). The (poly)alkylene polyamine constituting the phosphate may be a linear or branched compound or a cyclic compound. The cyclic (poly)alkylene polyamine may be a compound in which adjacent nitrogen atoms are bonded to form a ring. In the (poly)alkylene polyamine, a hydrogen atom of an amino group or an imino group may be substituted with a substituent (for example, a $C_{1-4}$ alkyl group such as a methyl group or an ethyl group).

The representative alkylene polyamine constituting the phosphate salt is alkylene diamine. The number of carbon atoms of the alkylene diamine may be 1 to 20 or 2 to 10. Examples of the alkylene diamine having 1 to 20 carbon atoms include diaminomethane, ethylene diamine, 1,2-propane diamine, tetramethylene diamine, pentamethylene diamine, hexamethylene diamine, 1,7-diaminoheptane, 1,8-diaminooctane, 1,9-diaminononane, 1,10-diaminodecane, and pyrazolidine.

Examples of the polyalkylene polyamine constituting the phosphate salt include dialkylene polyamine, trialkylene polyamine, tetraalkylene polyamine, pentaalkylene polyamine, hexaalkylene polyamine, heptaalkylene polyamine, and octaalkylene polyamine. The number of carbon atoms of each alkylene group may be 2 to 10, 2 to 6, or 2 to 4. Specific examples of the polyalkylene polyamine include diethylene triamine, piperazine, 2,5-dimethylpiperazine, 1,4-bis(aminoethyl)piperazine, triethylenetetramine, and tetraethylenepentamine.

Examples of commercially available products of the fire retardant including a phosphorus atom and a nitrogen atom include "ADK STAB FP-2100JC" manufactured by ADEKA Corporation, "ADK STAB FP2200" manufactured by ADEKA Corporation, and "ADK STAB FP2200S" manufactured by ADEKA Corporation.

The content of the fire retardant including a phosphorus atom and a nitrogen atom in the rubber composition is typically 50 to 250 parts by mass, and may be 80 to 200 parts by mass, or 80 to 150 parts by mass, with respect to 100 parts by mass of the ethylene-α-olefin-based copolymer. When the content of the fire retardant including a phosphorus atom and a nitrogen atom is large, fire retardancy tends to improve. When the content of the fire retardant including a phosphorus atom and a nitrogen atom is too large, processability tends to decrease.

Component (C): Thermally Expandable Graphite

The combination of the thermally expandable graphite and the fire retardant as the component (B) can contribute to high fire retardancy of the rubber molded body. The thermally expandable graphite is, as understood by a person skilled in the art, a material including graphite having a layered structure and an intercalation compound disposed between layers of the layered structure. The thermally expandable graphite is obtained, for example, by a method of treating powder such as natural scaly graphite, pyrolytic graphite, or kish graphite with an inorganic acid such as conc. sulfuric acid, nitric acid, or selenic acid and a strong oxidizing agent such as conc. nitric acid, perchloric acid, a perchlorate, a permanganate, a dichromate, and hydrogen peroxide. In particular, the component (B) may be a thermally expandable graphite obtained by subjecting to an acid treatment and further neutralizing with ammonia, an aliphatic lower amine, an alkali metal compound, an alkaline earth metal compound, or the like. Examples of commercially available products of the thermally expandable graphite include "MZ-260" manufactured by AIR WATER INC. and "CA-60N" manufactured by AIR WATER INC. The thermally expandable graphite is a component included in the rubber composition separately from the additive particles as the component (D).

The content of the thermally expandable graphite in the rubber composition is typically 1 to 100 parts by mass and may be 5 to 70 parts by mass, with respect to 100 parts by mass of the ethylene-α-olefin-based copolymer. When the content of the thermally expandable graphite is large, fire retardancy tends to improve. When the content of the thermally expandable graphite is too large, processability tends to decrease.

Component (D): Additive Particles

The additive particles used as the component (D) can be porous particles or particles having ion exchangeability. The additive particles may be porous particles having ion exchangeability. That is, the additive particles used as the component (D) can be porous particles, particles having ion exchangeability, or porous particles having ion exchangeability. These additive particles are considered to contribute to mold contamination suppression by adsorbing a bloomed material generated in the rubber composition in the molding step. The porous particles can function as an adsorbent on the basis of the porous form thereof. The particles having ion exchangeability can function as an adsorbent by interaction with the bloomed material on the basis of ion exchangeability.

The porous particles as the additive particles may be inorganic particles. The porous particles may be at least one kind selected from the group consisting of silica particles, magnesium oxide particles, titanium oxide particles, calcium silicate particles, magnesium silicate particles, and activated carbon. The particles having ion exchangeability as the additive particles may also be inorganic particles. The particles having ion exchangeability may be at least one kind selected from the group consisting of hydrotalcite particles, zeolite particles, zirconium particles, alumina particles, kaolinite particles, halloysite particles, smectite particles, vermiculite particles, montmorillonite particles, imogolite particles, allophane particles, gibbsite particles, and mordenite particles. As the additive particles, at least one kind of particles selected from those may be used. The additive particles may be silica particles, hydrotalcite particles, or a combination thereof. According to this, a particularly excellent effect of suppressing mold contamination is obtainable.

The content of the additive particles as the component (D) is typically 15 parts by mass or less with respect to 100 parts by mass of the ethylene-α-olefin-based copolymer. When the content thereof is 15 parts by mass or less, mold contamination in the molding step can be suppressed while particularly high fire retardancy is maintained. From the same viewpoint, the content thereof may be 10 parts by mass or less or 5 parts by mass or less. The content of the additive particles may be 0.5 part by mass or more or 1 part by mass or more, with respect to 100 parts by mass of the ethylene-α-olefin-based copolymer. When the content of the additive is large, the effect of suppressing mold contamination tends to increase.

Other Components

The rubber composition of the present embodiment can further contain other components in addition to the components described above, within the range in which the effects of the present invention are not significantly impaired. Examples of the other components include a reinforcing agent, a softening agent, a vulcanizing agent, a vulcanization accelerator, a vulcanization aid, a processing aid, a silane coupling agent, and a rubber component other than the ethylene-α-olefin-based copolymer.

Examples of the reinforcing agent include various types of carbon black such as SRF, GPF, FEF, MAF, ISAF, SAF, FT, and MT, calcium carbonate, mica, magnesium silicate, aluminum silicate, lignin, aluminum hydroxide, and magnesium hydroxide. These may be used alone or in combination. Here, among these, the porous particles and the particles having ion exchangeability are classified as additive particles of the component (D). The content of the reinforcing agent in the rubber composition may be 200 parts by mass or less, or 150 parts by mass or less, with respect to 100 parts by mass of the ethylene-α-olefin-based copolymer rubber.

Examples of the softening agent include paraffin-based oil such as process oil, lubricating oil, paraffin, and liquid paraffin, naphthene-based oil, petroleum asphalt, Vaseline, coal tar pitch, castor oil, linseed oil, factice, beeswax, and ricinoleic acid. These are used alone or in combination. The content of the softening agent in the rubber composition may be 100 parts by mass or less, or 70 parts by mass or less, with respect to 100 parts by mass of the ethylene-α-olefin-based copolymer rubber.

Examples of the vulcanizing agent include sulfur, a sulfur-based compound, and an organic peroxide. The vulcanizing agent may include an organic peroxide. These may be used alone or in combination. The sulfur may be powder sulfur, precipitated sulfur, colloidal sulfur, surface-treated sulfur, insoluble sulfur, or the like. The content of the sulfur and the sulfur-based compound in the rubber composition may be 0.01 to 10 parts by mass, or 0.1 to 5 parts by mass, with respect to 100 parts by mass of the ethylene-α-olefin-based copolymer rubber.

Examples of the organic peroxide include dicumyl peroxide, 2,5-dimethyl-2,5-di(t-butylperoxy)hexane, 2,5-dimethyl-2,5-di(benzoylperoxy)hexane, 2,5-dimethyl-2,5-di(t-butylperoxy)hexyne-3, di-t-butyl peroxide, di-t-butyl peroxide-3,3,5-trimethylcyclohexane, and t-butyl hydroperoxide. The organic peroxide may be at least one compound selected from dicumyl peroxide, di-t-butyl peroxide, and di-t-butyl peroxide-3,3,5-trimethylcyclohexane or may be dicumyl peroxide. The content of the organic peroxide may be 0.1 to 15 parts by mass, or 1 to 8 parts by mass, with respect to 100 parts by mass of the ethylene-α-olefin-based copolymer rubber.

Examples of the vulcanization accelerator include tetramethylthiuram monosulfide, tetramethylthiuram disulfide, tetraethylthiuram disulfide, tetrabutylthiuram disulfide, dipentamethylenethiuram monosulfide, dipentamethylenethiuram disulfide, dipentamethylenethiuram tetrasulfide, N,N'-dimethyl-N,N'-diphenylthiuram disulfide, N,N'-dioctadecyl-N, N-diisopropylthiuram disulfide, N-cyclohexyl-2-benzothiazolesulfenamide, N-oxydiethylene-2-benzothiazolesulfenamide, N,N-diisopropyl-2-benzothiazole-sulfenamide, 2-mercaptobenzothiazole, 2-(2, 4-dinitrophenyl)mercaptobenzothiazole, 2-(2,6-diethyl-4-morpholinothio)benzothiazole, dibenzothiazyl disulfide, diphenylguanidine, triphenylguanidine, diorthotolylguanidine, orthotolyl-bi-guanide, diphenylguanidine-phthalate, n-butylaldehydeaniline, hexamethylenetetramine, acetaldehyde ammonia, 2-mercaptoimidazoline, thiocarbanilide, diethylthiourea, dibutylthiourea, trimethylthiourea, diorthotolylthiourea, zinc dimethyldithiocarbamate, zinc diethylthiocarbamate, zinc di-n-butyldithiocarbamate, zinc ethylphenyldithiocarbamate, zinc butylphenyldithiocarbamate, sodium dimethyldithiocarbamate, selenium dimethyldithiocarbamate, tellurium diethyldithiocarbamate, zinc dibutylxanthogenate, and ethylene thiourea. These may be used alone or in combination. The content of the vulcanization accelerator in the rubber composition may be 0.05 part by mass or more and 20 parts by mass or less, or 0.1 part by mass or more and 8 parts by mass or less, with respect to 100 parts by mass of the ethylene-α-olefin-based copolymer rubber.

Examples of the vulcanization aid include triallyl isocyanurate, N,N'-m-phenylenebismaleimide, methacrylic acid, methyl methacrylate, ethyl methacrylate, propyl methacrylate, isopropyl methacrylate, n-butyl methacrylate, i-butyl methacrylate, sec-butyl methacrylate, t-butyl methacrylate, 2-ethylhexyl methacrylate, cyclohexyl methacrylate, isodecyl methacrylate, lauryl methacrylate, tridecyl methacrylate, stearyl methacrylate, 2-hydroxyethyl methacrylate, hydroxypropyl methacrylate, polyethylene glycol monomethacrylate, polypropylene glycol monomethacrylate, 2-ethoxyethyl methacrylate, tetrahydrofurfuryl methacrylate, allyl methacrylate, glycidyl methacrylate, benzyl methacrylate, dimethylaminoethyl methacrylate, diethylaminoethyl methacrylate, methacryloxyethyl phosphate, 1,4-butanediol diacrylate, ethylene glycol dimethacrylate, 1,3-butylene glycol dimethacrylate, neopentyl glycol dimethacrylate, 1,6-hexanediol dimethacrylate, diethylene glycol dimethacrylate, triethylene glycol dimethacrylate, polyethylene glycol dimethacrylate, dipropylene glycol dimethacrylate, polypropylene glycol dimethacrylate, trimethylolethane trimethacrylate, trimethylolpropane trimethacrylate, allyl glycidyl ether, N-methylolmethacrylamide, 2,2-bis(4-methacryloxypolyethoxyphenyl)propane, aluminum methacrylate, zinc methacrylate, calcium methacrylate, magnesium methacrylate, 3-chloro-2-hydroxypropyl methacrylate, zinc oxide, and magnesium oxide. These may be used alone or in combination. The content of the vulcanization aid in the rubber composition may be 0.05 part by mass or more and 15 parts by mass or less, or 0.1 part by mass or more and 8 parts by mass or less, with respect to 100 parts by mass of the ethylene-α-olefin-based copolymer rubber.

Examples of the processing aid include fatty acids such as oleic acid, palmitic acid, and stearic acid; fatty acid metal salts such as zinc laurate, zinc stearate, barium stearate, and calcium stearate; fatty acid esters; and glycols such as ethylene glycol and polyethylene glycol. These may be used alone or in combination. The content of the processing aid in the rubber composition may be 0.2 part by mass or more and 10 parts by mass or less, or 0.3 part by mass or more and 8 parts by mass or less, with respect to 100 parts by mass of the ethylene-α-olefin-based copolymer rubber.

Examples of the silane coupling agent include silane-based silane coupling agents, vinyl-based silane coupling agents, methacrylic silane coupling agents, epoxy-based silane coupling agents, mercapto-based silane coupling agents, sulfur-based silane coupling agents, amino-based silane coupling agents, ureide-based silane coupling agents, and isocyanate-based silane coupling agents. These may be used alone or in combination. The content of the silane coupling agent in the rubber composition may be 0.1 part by mass or more and 10 parts by mass or less, or 0.5 part by mass or more and 8 parts by mass or less, with respect to 100 parts by mass of the ethylene-α-olefin-based copolymer rubber.

Examples of the rubber component other than the ethylene-α-olefin-based copolymer rubber include natural rubber, isoprene rubber, butadiene rubber, styrene butadiene rubber, and butyl rubber. The content of the rubber component other than the ethylene-α-olefin-based copolymer rubber in the rubber composition may be 10 parts by mass or more and 40 parts by mass or less, or 15 parts by mass or more and 30 parts by mass or less, with respect to 100 parts by mass of the ethylene-α-olefin-based copolymer rubber.

The rubber composition according to the present embodiment can be a halogen-free composition not containing a fire retardant which is composed of a halogenated composition. When a high level of fire retardancy is expressed by the halogen-free fire retardant, mold contamination tends to particularly easily occur, but the rubber composition according to the present embodiment can express both of a high level of fire retardancy and suppressed mold contamination even when the rubber composition is halogen free.

The rubber composition can be obtained, for example, by kneading a mixture of the ethylene-α-olefin-based copolymer rubber and other component. Kneading can be performed using closed kneading machines such as a mixer, a kneader, and a twin-screw extruder. Kneading can be performed until the respective components are uniformly mixed. The kneading time may be 1 minute or longer and 60 minutes or shorter. The kneading temperature may be 40° C. or higher and 200° C. or lower.

Rubber Molded Body

The rubber molded body according to an embodiment includes the rubber composition according to the aforementioned embodiment and/or a vulcanizate thereof. FIG. 1 is a cross-sectional view illustrating an embodiment of a rubber molded body. A rubber molded body 1 illustrated in FIG. 1 can be produced, for example, by a method including heat-molding a rubber composition in a mold. The method for producing a rubber molded body can include forming a rubber molded body by heat-molding a rubber composition in a mold and vulcanizing the rubber composition. The rubber composition may be vulcanized while the rubber molded body is heat-formed, or the rubber composition forming the rubber molded body may be vulcanized after the rubber molded body is formed.

For example, by molding the rubber composition in a mold by a molding machine such as an injection molding machine, a compression molding machine, or a hot air vulcanizing apparatus while heating the rubber composition at 120° C. or higher and 250° C. or lower, or 140° C. or higher and 220° C. or lower for 1 minute or longer and 60 minutes or shorter, the vulcanized rubber molded body can be obtained.

The rubber molded body can function as a fire-retardant rubber. This rubber molded body can be used, for example, in various members such as fire-retardant electrical wires, fire-retardant gaskets, and fire-retardant electrical components.

EXAMPLES

Hereinafter, the present invention will be described in detail on the basis of Examples. However, the present invention is not limited thereto.

1. Evaluation method of copolymer rubber (1) Content of Ethylene Unit and Content of Propylene Unit A copolymer rubber was molded by a hot press machine to produce a film having a thickness of about 0.1 mm. The infrared absorption spectrum of this film was measured by an infrared spectrophotometer (IR-810 manufactured by JASCO Corporation). The content of the ethylene unit and the content of the propylene unit were obtained from the obtained infrared absorption spectrum according to a method described in reference literatures (Characterization of Polyethylene by Infrared Absorption Spectrum by Takayama, Usami, et al., and Die Makromolekulare Chemie, 177, 461 (1976) by Mc Rae, M. A., MaddamS, W. F., et al.).

(2) Iodine Value

Three types of ethylene-propylene-5-ethylidene-2-norbornene copolymer rubbers having different iodine values in accordance with "JIS K0070-1992 6. Iodine Value" were each molded by a hot press machine to produce films having a thickness of about 0.2 mm. The infrared absorption spectrum of each film was measured by an infrared spectrophotometer (IR-700 manufactured by JASCO Corporation). A peak derived from 5-ethylidene-2-norbornene (absorption peak at 1686 cm$^{-1}$) and a base peak (absorption peak at 1664 to 1674 cm$^{-1}$) for each film were obtained from the obtained infrared absorption spectrum, and the IR index was calculated by the following formula (I). A is the transmittance of the base peak, B is the transmittance of the peak derived from 5-ethylidene-2-norbornene, and D (mm) is the thickness of the film.

$$\text{IR index}=\text{Log}(A/B)/D \qquad \text{formula (I)}$$

A calibration curve of iodine values represented by the following formula (II) was obtained from the IR index and the above-described known iodine values.

$$\text{Iodine value}=\alpha \times \text{IR index}+\beta \qquad \text{formula (II)}$$

α and β in the formula (II) are each a constant.

(3) Molecular Weight Distribution

Values of the weight average molecular weight (Mw) and the number average molecular weight (Mn) of the copolymer rubber in terms of standard polystyrene were measured under the following conditions by a gel permeation chromatography (GPC) method.

GPC apparatus: trade name HLC-8121GPC/HT, manufactured by Tosoh Corporation

Column: trade name TSKgel GMHHR-H(S)HT, manufactured by Tosoh Corporation

Molecular weight standard substance: polystyrene having a molecular weight of 500 or more and 20,000,000 or less Elution solvent flow velocity: 1.0 mL/min Sample concentration: 1 mg/mL Measurement temperature: 140° C.

Elution solvent: orthodichlorobenzene

Injection amount: 500 µL

Detector: differential refractometer

2. Preparation of Rubber Composition and Evaluation Thereof Example 1 (Preparation of Rubber Composition)

100 parts, by mass of ethylene-propylene-5-ethylidene-2-norbornene copolymer rubber as the component (A), 140 parts by mass of phosphorus fire retardant containing a phosphorus atom and a nitrogen atom (trade name "ADK STAB FP-2100JC" manufactured by ADEKA Corporation) as the component (B), 20 parts by mass of thermally expandable graphite (trade name "MZ-260" manufactured by AIR WATER INC.) as the component (C), 1.5 parts by mass of porous silica particles (trade name "Nipsil VN3" manufactured by Tosoh Silica Corporation) as the component (D), and the following additives as other components were kneaded for 4 minutes at a rotor revolution number of 80 rpm using a 1700 mL Banbury mixer (manufactured by Kobe Steel, Ltd.) adjusted at a start temperature of 70° C.

Other Components:

Pentaerythritol (manufactured by KOEI CHEMICAL COMPANY, LIMITED): 1 part by mass Carbon black (trade name "Asahi #60H" manufactured by Asahi Carbon Co., Ltd.): 40 parts by mass Paraffin oil (trade name "Cosmo SR700" manufactured by Cosmo Oil Co., Ltd.): 35 parts by mass Zinc oxide (trade name "Zinc Oxide II" manufactured by SEIDO CHEMICAL INDUSTRY CO., LTD.): 5 parts by mass Stearic acid (trade name "STEARIC ACID 50S" manufactured by New Japan Chemical Co., Ltd.): 1 part by mass The ethylene-propylene-5-ethylidene-2-norbornene copolymer rubber used as the copolymer rubber of the component (A) was evaluated by the aforementioned method and was found to have the following characteristics.

Content of the ethylene unit: 65%

Content of the propylene unit: 31%

Iodine value: 11

Molecular weight distribution: 2.4

343.5 parts by mass of the kneaded product thus obtained, 2.5 parts by mass of zinc di-n-butyldithiocarbamate (trade name Rhenogran ZDBC-80, manufactured by Rhein Chemie Corporation), 0.63 part by mass of tetramethylthiuram disulfide (trade name Rhenogran TMTD-80, manufactured by Rhein Chemie Corporation), 0.71 part by mass of dipentamethylenethiuram tetrasulfide (trade name Rhenogran DPTT-70, manufactured by Rhein Chemie Corporation), 1.25 parts by mass of 2-mercaptobenzothiazole (trade name Rhenogran MBT-80, manufactured by Rhein Chemie Corporation), and 1.5 parts by mass of sulfur were kneaded using an 8 inch open roll (manufactured by KANSAI ROLL Co., Ltd.) at a roll temperature of 40° C. to obtain a rubber composition.

Production of Rubber Molded Body

The obtained rubber composition was compressed for 20 minutes in a mold while being heated at a set temperature of 170° C. with a 100-ton press (trade name: PSF-B010, manufactured by KANSAI ROLL Co., Ltd.), thereby it was molded while being vulcanized to produce a vulcanized sheet having a thickness of 2 mm. After the molding, the vulcanized sheet was extracted from the mold. Regarding the mold contamination property of the rubber composition, a case where remaining of the adherend in the mold was not substantially confirmed by visual inspection was evaluated as "Good," and a case where remaining of the adherend was confirmed was evaluated as "Poor."

Evaluation of Rubber Molded Body

The fire retardancy of the vulcanized sheet thus obtained was evaluated by a fire retardancy test based on UL-94 (vertical test) (according to a vertical burning test defined in "burning test of plastic materials for device parts" of UL subject 94 (UNDERWRITERS LABORATORIES INC.). The shape of the test piece was set to have a length of 125.0 mm, a width of 13.0 mm, and a thickness of 2.0 mm (²⁄₂₅ inch).

The oxygen index of the vulcanized sheet thus obtained was measured according to JIS K 7201-2. The shape of the test piece was set to have a length of 120.0 mm, a width of 6.5 mm, and a thickness of 2.0 mm.

Examples 2 to 8 and Comparative Examples 1 to 5

Rubber compositions were prepared in the same manner as in Example 1, except that the amount of each component blended was changed as shown in Table 1 or Table 2, and the evaluation thereof was performed. Hydrotalcite particles used in Example 6 are "DHT-4A" (trade name) manufactured by Kyowa Chemical Industry Co., Ltd.

Table 1 and Table 2 show the blending ratio of the rubber composition in Examples and Comparative Examples, and the evaluation results. The blending ratio in the tables is parts by mass.

TABLE 1

|     |                          | Ex. 1 | Ex. 2 | Ex. 3 | Ex. 4 | Ex. 5 | Ex. 6 | Ex. 7 | Ex. 8 |
|-----|--------------------------|-------|-------|-------|-------|-------|-------|-------|-------|
| (A) | EPDM                     | 100   | 100   | 100   | 100   | 100   | 100   | 100   | 100   |
| (B) | Phosphorus fire retardant| 140   | 140   | 140   | 140   | 100   | 140   | 80    | 200   |
| (C) | Thermally expandable graphite | 20 | 20 | 20 | 20 | 10 | 20 | 20 | 20 |
| (D) | Silica particles         | 1.5   | 3.0   | 5.0   | 10    | 1.5   | —     | 1.5   | 3.0   |
|     | Hydrotalcite particles   | —     | —     | —     | —     | —     | 1.5   | —     | —     |

TABLE 1-continued

|   | | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Fire retardancy | UL94V (2 mmt) | V-0 | V-0 | V-0 | V-0 | V-0 | V-0 | V-0 | V-0 |
| | Oxygen index (%) | 31 | 30 | 30 | 28 | 28 | 31 | 28 | 32 |
| Mold contamination property | | Good | Good | Good | Good | Good | Good | Good | Good |

TABLE 2

|   | | Comp. Ex. 1 | Comp. Ex. 2 | Comp. Ex. 3 | Comp. Ex. 4 | Comp. Ex. 5 |
|---|---|---|---|---|---|---|
| (A) | EPDM | 100 | 100 | 100 | 100 | 100 |
| (B) | Phosphorus fire retardant | 140 | — | 140 | 100 | 140 |
| (C) | Thermally expandable graphite | — | 20 | 20 | 10 | 20 |
| (D) | Silica particles | 1.5 | 1.5 | — | — | 20 |
| | Hydrotalcite particles | — | — | — | — | — |
| Fire retardancy | UL94V (2 mmt) | less than V-2 | less than V-2 | V-0 | V-0 | less than V-2 |
| | Oxygen index (%) | 26 | 23 | 31 | 29 | 27 |
| Mold contamination property | | Good | Good | Poor | Poor | Good |

It was confirmed that all of the rubber compositions of Examples have high fire retardancy and are also excellent in view of the mold contamination property. The rubber compositions of Comparative Examples 1 and 2 in which a fire retardant including a phosphorus atom and a nitrogen atom or a thermally expandable graphite is not included and the rubber composition of Comparative Example 5 in which the amount of the additive particles as the component (D) is more than 15 parts by mass were excellent in view of the mold contamination property, but did not have sufficient fire retardancy. The rubber compositions of Comparative Examples 3 and 4 in which the additive particles as the component (D) are not included exhibited high fire retardancy, but contaminated the mold at the time of molding.

REFERENCE SIGNS LIST

1: rubber molded body.

The invention claimed is:

1. A rubber composition comprising:
   (A) an ethylene-α-olefin-based copolymer rubber comprising an ethylene unit and an α-olefin unit having 3 or more carbon atoms;
   (B) a fire retardant comprising a phosphate salt formed from phosphoric acid or a polyphosphoric acid and alkylene polyamine or polyalkylene polyamine;
   (C) a thermally expandable graphite; and
   (D) additive particles that are porous particles or particles having ion exchangeability, wherein the additive particles are silica particles, hydrotalcite particles, or a combination thereof, and wherein
   a content of the fire retardant is 50 to 250 parts by mass and a content of the additive particles is 0.5 parts by mass to 10 parts by mass with respect to 100 parts by mass of the ethylene-α-olefin-based copolymer rubber.

2. The rubber composition according to claim 1, wherein the content of the additive particles is 5 parts by mass or less with respect to 100 parts by mass of the ethylene-α-olefin-based copolymer rubber.

3. The rubber composition according to claim 1, wherein the ethylene-α-olefin-based copolymer rubber further comprising a nonconjugated polyene unit.

4. A rubber molded body comprising the rubber composition according to claim 1 and/or a vulcanizate thereof.

5. A method for producing a rubber molded body, comprising heat-molding the rubber composition according to claim 1 in a mold.

* * * * *